Aug. 16, 1966
B. R. BAIER
3,266,828
FASTENER ASSEMBLY FOR USE IN VIBRATORY
MATERIAL HANDLING APPARATUS
Filed July 29, 1964
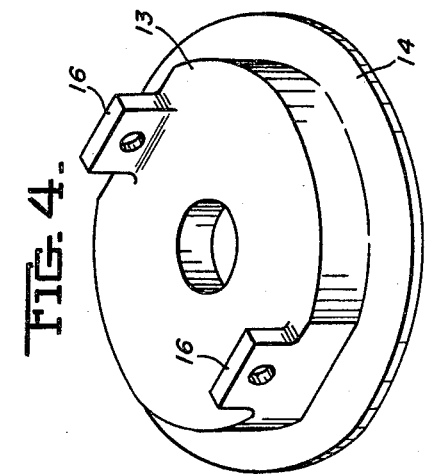
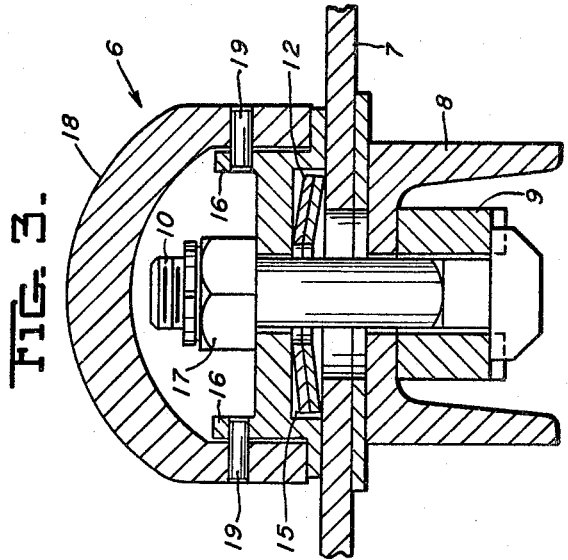
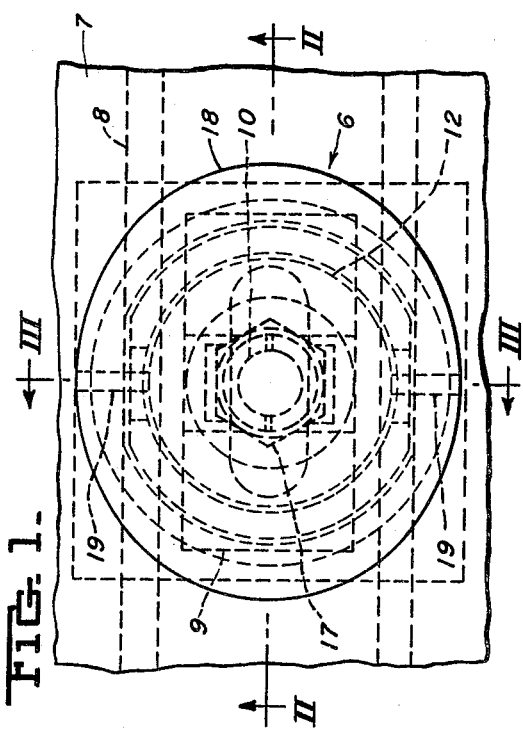
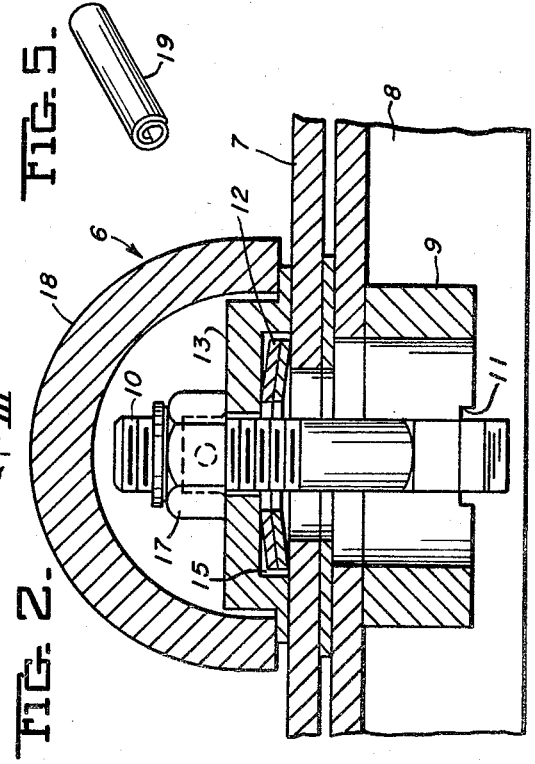
INVENTOR.
BROOKE R. BAIER
By Christy, Parmelee & Strickland
Attorneys

United States Patent Office 3,266,828
Patented August 16, 1966

3,266,828
FASTENER ASSEMBLY FOR USE IN VIBRATORY MATERIAL HANDLING APPARATUS
Brooke R. Baier, Bellevue, Wash., assignor to Dravo Corporation, Pittsburgh, Pa., a corporation of Pennsylvania
Filed July 29, 1964, Ser. No. 385,977
5 Claims. (Cl. 287—189.36)

This invention relates to threaded fastener assemblies especially adapted for use in material handling apparatus, and particularly to fasteners for use with vibratory screens and conveyors and like material handling apparatus.

Material handling apparatus of the character to which the present invention is applicable has a deck plate which may be either part of a screen used for screening material being handled or may be imperforate for the transfer of material from one point to another. In either case there is secured to the underside of the plate a transverse structural member generally used as a connection for transmitting vibratory forces to the plate. Since the materials being handles are frequently of a highly abrasive character and are often at high temperature, e.g., sinter, cement clinker, pellets and the like, replacement of different parts of the apparatus is required from time to time, as a result of which it is desirable to detachably secure the cross bars to the plates. Bolts and nuts are commonly used with deflectors that afford some protection from the abrasive material, but looseness may quickly develop as a result of elongation of the bolt because of high temperatures or from other conditions. This looseness is aggravated by vibration and may require costly shut-downs at unscheduled intervals.

The present invention provides a fastener which is reliable over extended intervals, which is spring loaded to compensate for the loosening tendencies, and which has a cover member for reducing wear on the fastening members.

An object of the present invention is to provide a fastener for vibratory material handling apparatus which compensates for its own loosening tendencies.

Another object is to provide a fastener which is protected from damage by the material being handled.

These and other objects will be apparent to those skilled in the art and more fully understood by reference to the following description, wherein:

FIG. 1 is a plan view of the fastener assembly;
FIG. 2 is a side elevation along line II—II of FIG. 1;
FIG. 3 is an end elevation along line III—III of FIG. 1;
FIG. 4 is a perspective view of the clamping plate; and
FIG. 5 is a perspective view of the spring pin.

Referring to FIGS. 1, 2, and 3, a preferred embodiment of my invention is shown to advantage in the various views. The fastener designated generally as 6, is shown joining a section of a plate member 7 to a frame or cross member 8. A conveyor generally comprises a succession of such deck plates 7 and there are generally at least one of these cross frames 8 for each plates. The plates 7 may, however, be part of a vibratory screen as well as being imperforate for the conveying of material.

The cross member 8 is generally an inverted channel section with the web confronting the underside of the plate 7 to which it is attached. A bar washer or block 9 is disposed within the downwardly projecting sides or legs of the cross member 8 and abuts the underside of the web of said member. The aforesaid plate 7, cross member 8, and block 9 have suitable registering apertures for receiving a screw threaded member 10 which is preferably a T-head bolt. Desirably these apertures are arranged to permit insertion of the bolt 10 from the top of the assembly. As shown in the drawings, the aperture through the plate 7 is circular and of a diameter larger than the span of the T-head of the bolt, while the apertures in the cross member 8 and block 9 are elongated or slotted. The block 9 also has recesses or notches 11 on its lower face alongside its opening for receiving the T-head of the bolt to restrain the latter against rotation when the long axis of the T-head is transverse the long axis of the block opening. It is apparent that the bolt may be inserted from the top, head down, then rotated 90° to engage the head in the recess 11.

A plurality of spring discs 12 are circumposed about the threaded end of the bolt 10 with the bottom disc resting on plate 7. A special washer or clamping plate 13 (FIG. 4) is circumposed on the bolt and has a downwardly and outwardly projecting periphery to form a flange 14 and an inner cavity 15 which encloses the spring discs 12. The top portion of the clamping plate 13 has spaced upwardly extending lugs 16 integral therewith and is preferably out-of-round for a purpose explained later.

There is a lock nut 17 on the threaded end of the bolt 10 which is tightened down against the top surface of the plate 13 to compress the disc springs 12. The flange 14 is thereby jammed down against the plate 7 and the disc springs 12 are prevented from being too severely stressed. Tightening the nut 17 also draws the T-head of the bolts tight against the block 9 to make a firm connection between the cross member 8 and the plate 7.

Cover 18 is a dome-like member with its edges resting on flange 14 to substantially enclose the upper portion of the fastener 6 extending above the plate 7. Scroll spring pins 19 (FIG. 5) are inserted in registering holes in the side walls of cover 18 and the lugs 16, said pins being of a resilient material to frictionally engage and have a drive fit in the holes to hold the cover in place. The side walls of cover 18 are preferably out-of-round to conform to the shape of the clamping plate so as to resist any tendency of the cover to rotate and to assist in keeping the pins 19 tight in the openings.

When assembled as thus shown and described, the fastener 6 is able to withstand the severe stresses associated with a vibratory material handling apparatus to maintain a tight connection. As the fastener tends to loosen for various reasons, as by the longitudinal expansion of the bolt due to high temperatures, the disc springs 12 react to take up the slack by exerting pressure upwardly on clamping plate 13 and downwardly on plate 7 to maintain a tight connection between plate 7 and cross member 8. With this assembly, expansion and contraction of the bolt may take place without developing such looseness as would speedily progress into destructive looseness. Two disc springs 12 as shown can exert a very substantial force while requiring very little space, but without the clamping washer 13, the nut 17 might be turned so tight as to destroy much of the effective camber of the springs, which are intended only to take up slack when it develops after the connection has been initially made by tightening of the nut 17.

Cover 18 serves as a wear plate to keep the bolt 10, lock nut 17, and clamping washer 13 from direct abrasive contact with the material being handled, thereby permitting reuse of those elements when the cover 18 is worn out.

While I have shown one embodiment of the invention it should be understood that variations and modifications in the particular construction and arrangement of parts may be made within the scope of my invention.

I claim:
1. In a vibratory material handling apparatus comprising a deck plate over which material is passed and a transverse frame member secured to the undersurface thereof through which vibratory motion is transmitted to the deck plate, the invention comprising a fastening device for connecting the plate to the frame member, comprising,

(a) a bolt passing through the plate and frame with its head confined against rotation in the frame and with its threaded shank projecting beyond the top of the plate,
(b) disc springs on the projecting end of the bolt,
(c) a washer over the springs having a cavity on its undersurface in which the springs are confined and compressed against the plate, the washer having a depending portion outside the springs bearing against the plate for limiting the compression under which the springs are placed, and
(d) a nut on the threaded end of the bolt adapted to jam the depending portion of the washer against the plate and to compress the springs and hold the frame member tightly clamped to the plate.

2. The invention defined in claim 1, wherein the washer has a dome-like cover member removably secured thereto for protecting the bolt and nut from material passing over the plate.

3. The invention defined in claim 2, wherein the washer has upstanding lugs each with a hole therethrough, and the cover has holes registering with those in the lugs, and friction pins having a drive fit in the holes.

4. The invention as defined in claim 1, wherein the frame member is a channel having depending sides and the bolt has a T-head and wherein there is a block with an elongated opening through it positioned in the channel between the depending sides thereof, and wherein the web of the channel and the block have correspondingly oriented elongated openings to permit the bolt head to pass therethrough only when the long axis of the head coincides with the long axes of the openings but which prevent the head from moving therethrough when the long axis of the head is transverse to the long axes of the openings.

5. The invention as defined in claim 4, wherein the lower face of the block is notched alongside its opening to receive the head of the bolt when the axis of the head is in said transverse position.

References Cited by the Examiner
UNITED STATES PATENTS

| | | | |
|---|---|---|---|
| 1,515,996 | 11/1924 | Buchanan. | |
| 2,907,418 | 10/1959 | Hudson et al. | 189—36 |
| 2,959,258 | 11/1960 | Hagamann | 189—36 |

HARRISON R. MOSELEY, *Primary Examiner.*

J. K. BELL, *Assistant Examiner.*